(12) United States Patent
Moore et al.

(10) Patent No.: US 9,243,943 B2
(45) Date of Patent: Jan. 26, 2016

(54) AIR-FLOW SENSOR FOR ADAPTER SLOTS IN A DATA PROCESSING SYSTEM

(71) Applicant: INTERNATIONAL BUSINESS MACHINES CORPORATION, Armonk, NY (US)

(72) Inventors: Arden L. Moore, Cedar Park, TX (US); Katie L. Pizzolato, Austin, TX (US); Carrie Sitten Westmark, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 346 days.

(21) Appl. No.: 13/859,842

(22) Filed: Apr. 10, 2013

(65) Prior Publication Data

US 2014/0305183 A1    Oct. 16, 2014

(51) Int. Cl.
| | |
|---|---|
| G01F 1/684 | (2006.01) |
| G01F 1/688 | (2006.01) |
| G01F 1/69 | (2006.01) |
| G01F 25/00 | (2006.01) |
| G01F 1/699 | (2006.01) |
| G06F 1/20 | (2006.01) |
| G05D 7/06 | (2006.01) |

(52) U.S. Cl.
CPC ........ *G01F 1/684* (2013.01); *G01F 1/69* (2013.01); *G01F 1/699* (2013.01); *G01F 25/0007* (2013.01); *G05D 7/0676* (2013.01); *G06F 1/206* (2013.01); *G01F 1/6888* (2013.01)

(58) Field of Classification Search
CPC ........ G01F 1/699; G01F 1/684; G01F 1/6888
USPC .............................. 73/204.11–204.27
See application file for complete search history.

(56) References Cited

U.S. PATENT DOCUMENTS

| | | | |
|---|---|---|---|
| 4,283,944 A | | 8/1981 | Gruner et al. |
| 4,501,144 A | | 2/1985 | Higashi et al. |
| 4,637,253 A | | 1/1987 | Sekimura et al. |
| 4,733,559 A | | 3/1988 | Aine et al. |
| 4,876,887 A | * | 10/1989 | Mickler ............ 73/204.11 |
| 5,186,051 A | | 2/1993 | Stecher et al. |
| 6,085,588 A | * | 7/2000 | Khadkikar et al. ...... 73/204.27 |
| 6,681,625 B1 | | 1/2004 | Berkcan et al. |
| 6,820,482 B2 | | 11/2004 | Lembke et al. |
| 7,278,308 B2 | * | 10/2007 | Gehman et al. ........... 73/204.26 |
| 7,641,546 B2 | | 1/2010 | Bok et al. |
| 7,707,880 B2 | | 5/2010 | Campbell et al. |
| 7,886,594 B2 | | 2/2011 | Sakuma |
| 8,054,927 B2 | | 11/2011 | Konishi |

(Continued)

*Primary Examiner* — Lisa Caputo
*Assistant Examiner* — Tran M Tran
(74) *Attorney, Agent, or Firm* — Russell Ng PLLC; Steven Bennett

(57) ABSTRACT

An air-flow sensor is configured to be positioned in an air-flow and attached to a surface in a manner that allows air to flow over an extremity of the sensor. The air-flow sensor includes a base plate, a first heater, a first temperature sensor, a spacer, a second heater, a second temperature sensor, and a cap. The base plate is configured to be the coupled to the surface. The first heater is positioned on the base plate and is configured to heat the base plate. The first temperature sensor is positioned to measure a first temperature of the first heater. The spacer is positioned on the first heater and the second heater is positioned on the spacer. The second temperature sensor is positioned to measure a second temperature of the second heater. The cap is positioned on the second heater, which is configured to heat the cap.

14 Claims, 5 Drawing Sheets

(56) References Cited

U.S. PATENT DOCUMENTS

| | | |
|---|---|---|
| 8,069,718 B2 | 12/2011 | Nakano et al. |
| 8,142,071 B1 | 3/2012 | Feller |
| 2010/0008038 A1 | 1/2010 | Coglitore |
| 2012/0053257 A1* | 3/2012 | Ishikawa et al. ............... 521/81 |

* cited by examiner

AIR-FLOW SENSOR FOR ADAPTER SLOTS IN A DATA PROCESSING SYSTEM

BACKGROUND

The disclosure generally relates to a data processing system and, more specifically, to an air-flow sensor for adapter slots in a data processing system.

In many modern data processing systems (e.g., servers), Peripheral Component Interconnect Express (PCIe) adapters are placed at a rear of the systems, which subjects the adapters to upstream preheat from processors, memory, and other components of the systems. In addition, power levels for adapters have generally risen over time. For example, field-programmable gate array (FPGA) modules routinely dissipate 20 to 30 Watts (W). The increased power dissipation and preheat associated with other components of a data processing system have made cooling PCIe adapters increasingly challenging.

While processors and memory usually have built-in temperature sensors that feed into thermal management algorithms of a data processing system, PCIe adapters have been relatively unprotected and rarely have on-board thermal instrumentation that is accessible by the system. In addition, knowledge of the thermal environment (i.e., approaching air speed and air temperature) to which a given adapter is subjected is often times more useful for determining supportability or understanding problems than component temperature alone. Unfortunately, a mechanical layout of an allocated PCIe area (of a data processing system) usually includes multiple narrow slots and/or pluggable cassettes which are not particularly suited for the implementation of standard air speed measurement techniques, e.g., anemometry or pressure taps.

Even when a temperature of approaching air is known, the temperature only represents one piece of information and without additional information (e.g., a speed of the approaching air) diagnosing cooling problems with PCIe adapters is problematic. Information limited to approaching air temperature also does not facilitate the implementation of 'smart servers' (with internal knowledge of air-flow) that can adjust fan speeds, as needed, according to the adapters that are implemented.

BRIEF SUMMARY

An air-flow sensor is configured to be positioned in an air path and attached to a surface in a manner that allows air to flow over an extremity of the sensor. The sensor includes: a base plate, a first heater, a first temperature sensor, a spacer, a second heater, a second temperature sensor, and a cap. The base plate is configured to be coupled to the surface. The first heater is positioned on the base plate and is configured to heat the base plate. The first temperature sensor is positioned to measure a first temperature of the first heater. The spacer is positioned on the first heater and the second heater is positioned on the spacer. The second temperature sensor is positioned to measure a second temperature of the second heater. The cap is positioned on the second heater, which is configured to heat the cap.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

The illustrative embodiments provide an air-flow sensor, a data processing system, and a computer program product (embodied on a computer-readable storage device) for calibrating an air-flow sensor.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device, and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

According to various embodiments of the present disclosure, an air-flow sensor that is designed to work within the space confines of an adapter (e.g., PCIe adapter) cassette or slot is disclosed. According to one aspect, a fixed power is supplied to a first heater or "main heater" of a sensor to raise a temperature of a top region of the sensor above a temperature of approaching air. In various embodiments, the temperature rise is measured via one internal temperature sensor and one upstream external temperature sensor (e.g., an internal thermocouple and an upstream thermocouple that is external to the sensor) and is dependant on the speed of the approaching air. In this manner, the measured temperature rise can be utilized to determine the speed of the air to which the sensor is subjected. In addition, a second heater or "guard heater" is implemented in the sensor to prevent conduction heat loss through a supporting region to which a base plate of the sensor is mounted. In general, implementation of the guard heater improves the accuracy of the sensor, as contrasted with so-called 'heated block' type approaches to measuring air speed. The disclosed sensor can be used to fully characterize a thermal environment within a given adapter (e.g., PCIe adapter) slot by measuring preheat and air-flow simultaneously.

Figure 1:
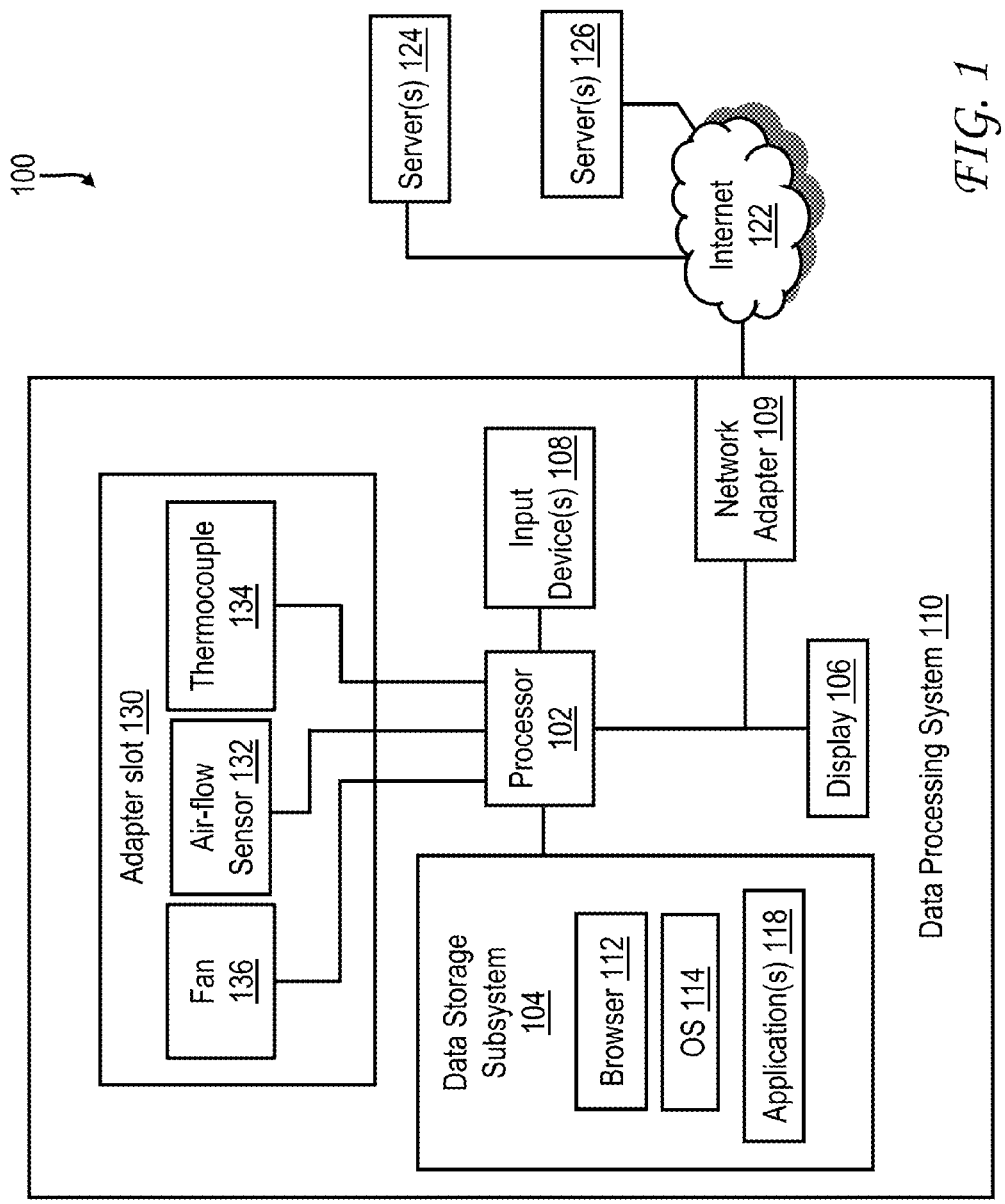
FIG. 1 is a diagram of a relevant portion of an exemplary data processing system environment that includes a data processing system with an air-flow sensor, configured according to an embodiment of the present disclosure, for an adapter slot of the data processing system.

With reference to FIG. 1, an exemplary data processing environment 100 is illustrated that includes a data processing system 110 that includes an adapter slot or cassette 130 (e.g., sized to receive a PCIe adapter) that includes an air generator (e.g., a fan) 136 and an air-flow sensing system (i.e., an air-flow sensor 132 and a temperature sensor (e.g., thermocouple) 134) configured according to one or more embodiments of the present disclosure to sense air-flow in an adapter slot and/or cassette. Data processing system 110 may take various forms, such as workstations, laptop computer systems, notebook computer systems, or desktop computer systems and/or clusters thereof. Data processing system 110 includes a processor 102 (which may include one or more processor cores for executing program code) coupled to a data storage subsystem 104, a display 106, one or more input devices 108, and a network adapter 109. Data storage subsystem 104 may include, for example, application appropriate amounts of various memories (e.g., dynamic random access memory (DRAM), static RAM (SRAM), and read-only memory (ROM)), and/or one or more mass storage devices, such as magnetic or optical disk drives.

Data storage subsystem 104 includes an operating system (OS) 114 for data processing system 110. Data storage subsystem 104 also includes application programs, such as a browser 112 (which may optionally include customized plug-ins to support various client applications), and other applications (e.g., a word processing application, a presentation application, and an email application) 118.

Display 106 may be, for example, a cathode ray tube (CRT) or a liquid crystal display (LCD). Input device(s) 108 of data processing system 110 may include, for example, a mouse, a keyboard, haptic devices, and/or a touch screen. Network adapter 109 supports communication of data processing system 110 with one or more wired and/or wireless networks utilizing one or more communication protocols, such as 802.x, HTTP, simple mail transfer protocol (SMTP), etc. Data processing system 110 is shown coupled via one or more wired or wireless networks, such as the Internet 122, to various file servers 124 and various web page servers 126 that provide information of interest to the user of data processing system 110.

Those of ordinary skill in the art will appreciate that the hardware components and basic configuration depicted in FIG. 1 may vary. For example, the fan may be located within an electronics enclosure but not necessarily directly associated with the adapter. The illustrative components within data processing system 110 are not intended to be exhaustive, but rather are representative to highlight components that may be utilized to implement the present invention. For example, other devices/components may be used in addition to or in place of the hardware depicted. The depicted example is not meant to imply architectural or other limitations with respect to the presently described embodiments.

Figure 2:
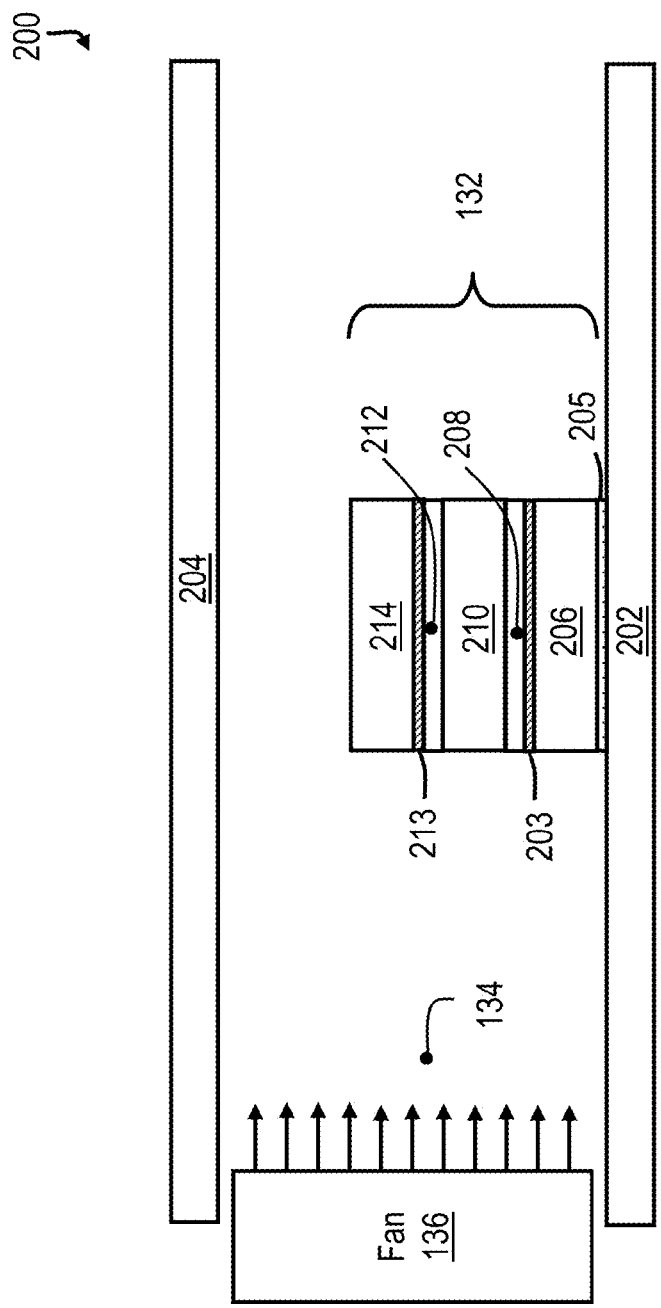
FIG. 2 is a side view of a relevant portion of an air-flow sensing system that includes an air-flow sensor configured according to the present disclosure.

With reference to FIG. 2, a side view of a relevant portion of an exemplary air-flow sensing system 200 is illustrated, as located within an adapter slot or cassette that includes a bottom wall 202 and a top wall 204. System 200 includes air-flow sensor 132, temperature sensor 134, and fan 136. While air-flow sensor 132 is illustrated as being attached (e.g., using an adhesive 205) to an inner surface of bottom wall 202, it should be appreciated that depending on the application air-flow sensor 132 may be mounted to an inner surface of top wall 204 or sidewalls (not illustrated) of the adapter slot or cassette. In general, sensor 132 is configured to be positioned in an air path in a manner that allows air to flow over an extremity of sensor 132.

Air-flow sensor 132 includes a base plate 206, a guard heater 203, a first temperature sensor 208, a spacer 210, a main heater 213, a second temperature sensor 212, and a cap (or top plate) 214. Guard heater 203 is positioned on base plate 206 (e.g., using an adhesive (not shown)) and is configured to heat base plate 206. First temperature sensor 208, which may be embedded in a thermally conductive material is positioned to measure a first temperature of guard heater 203. Spacer 210 is positioned on temperature sensor 208 and is made of a low thermal conductivity material (e.g., spacer 210 has a thermal conductivity less than about 0.4 Watts per meter Kelvin (W/mK)). Second temperature sensor 212, which may be embedded in a thermally conductive material, is positioned on spacer 210. Main heater 213 is positioned between second temperature sensor 212 and cap 214 and is configured to heat cap 214. Alternatively, heaters 203 and 213 may act as electrical resistance thermometers and, in this case, air-flow sensor 132 may be operated without internal temperature sensors 208 and 212.

Figure 3:
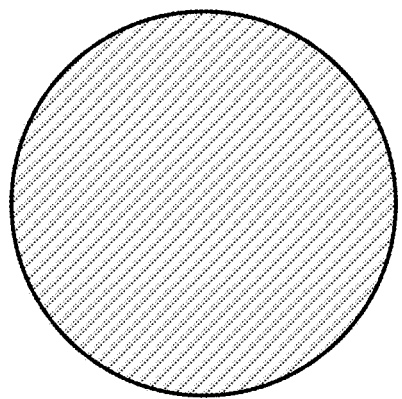
FIG. 3 is a top view of the air-flow sensor of FIG. 2.

In one or more embodiments, air-flow sensor 132 is bilaterally or radially symmetric about its central axis extending through the centers of base plate 206, spacer 210, and cap 214. As shown in FIG. 3, in at least one embodiment, air-flow sensor 132 has a cylindrical shape when viewed in plan that allows air-flow sensor 132 to be used irrespective of the orientation of incoming air-flow. In other embodiments, air-flow sensor 132 may be implemented with a different shape (e.g., a box or a cube).

In one or more embodiments, an air-flow sensor 132 includes: a circular metal (e.g., aluminum) base plate; an electrically powered guard heater (e.g., patterned metal lines (e.g., nickel or tungsten lines) encased in a polymide film such as Kapton®)), a first silicone epoxy or adhesive interface layer; a guard heater temperature sensor (e.g., thermocouple) embedded in the first silicone epoxy or adhesive interface layer; a polycarbonate resin thermoplastic (e.g., Lexan®) middle layer; a second silicone epoxy or adhesive interface layer; a main heater temperature sensor (e.g., thermocouple) embedded in the second silicon epoxy or adhesive interface layer; an electrically powered main heater (e.g., patterned metal lines (e.g., nickel or tungsten lines encased in a polymide film such as Kapton®)), and a circular metal (e.g., aluminum) top plate. In various embodiments, a thickness of the polycarbonate resin thermoplastic (e.g., Lexan®) middle layer is selected such that the thickness is large enough to measure a temperature differential across the spacer. For example, the spacer may have a thickness of 5 mm.

During calibration in an air-flow of known speed, main heater 213 is supplied with a fixed known power (e.g., 2 to 3 Watts (W)) that raises a temperature of top plate (cap) 214 above that of the approaching air generated by fan 136. The temperature of the approaching air is measured by a third temperature sensor (e.g., thermocouple 134) placed upstream of air-flow sensor 132. The power of guard heater 203 is then raised until the temperature difference between main heater 213 and guard heater 203 is negligible. As no net temperature difference exists across sensor 132, there is no conduction loss from cap 214 (i.e., the 'sensing' portion) of air-flow sensor 132, and the calibration of temperature rise versus air speed is independent of the mounting conditions (e.g., the adhesive used to secure air-flow sensor 132 to wall 202, the temperature of wall (e.g., PCIe cassette wall) 202, etc.). In general, air-flow sensor 132 provides a relatively large improvement over conventional 'heated block' approaches in which the heat loss to a support through conduction is often simply modeled and can be a relatively large percentage of the power supplied to main heater 213. In addition, the structure of air-flow sensor 132 prevents differences in support conditions between a data processing system (e.g., server) environment and a calibration environment that may introduce an error in calibration results. For example, a symmetric temperature condition of air-flow sensor 132 may be illustrated by an ICEPAK® computational fluid dynamics software simulation.

Figure 4:
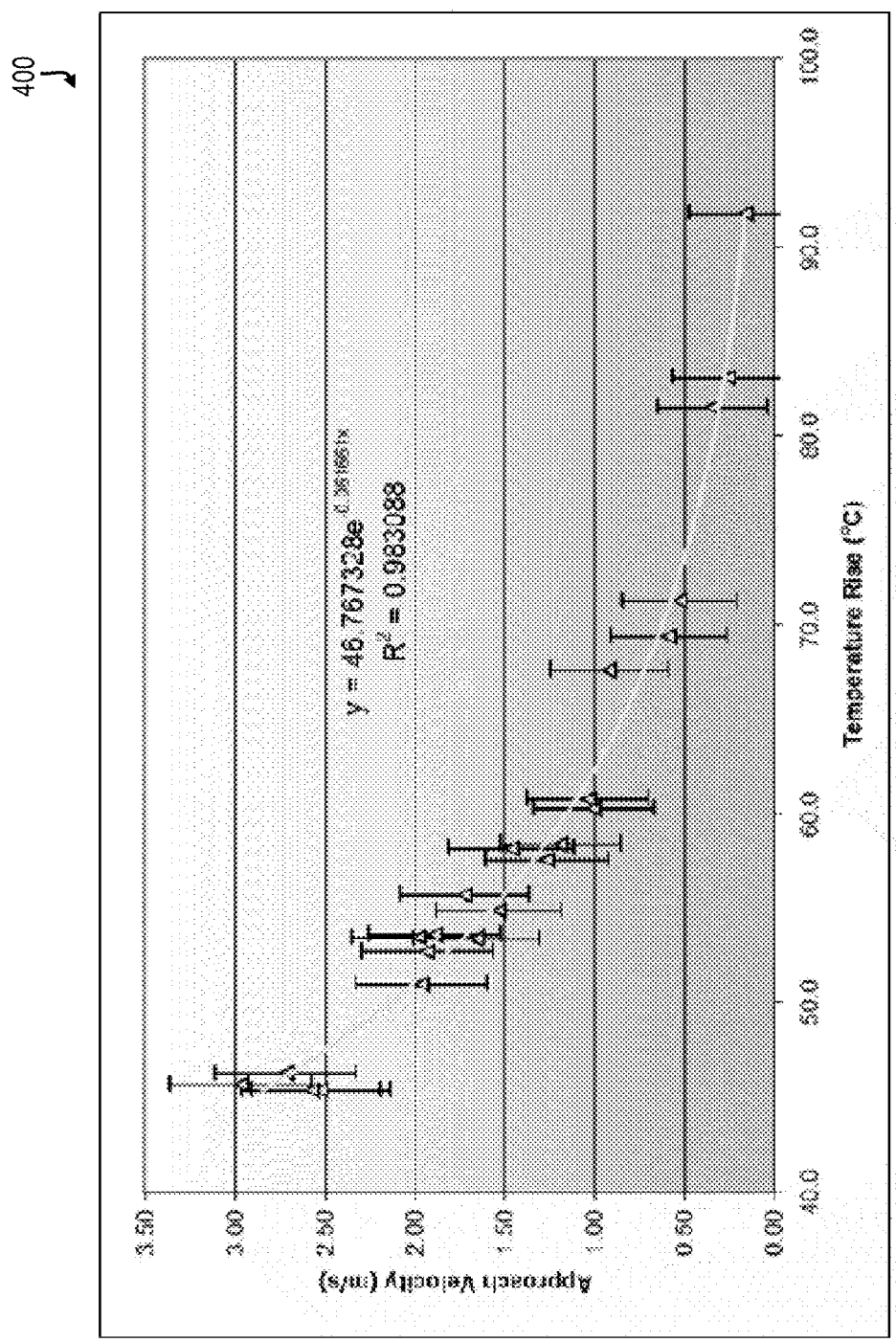
FIG. 4 is a chart that illustrates an exemplary calibration curve for the air-flow sensor of FIG. 2.

With reference to FIG. 4, the above-described measurement procedure is repeated with a fixed main heater power for various air speeds to facilitate the construction of a calibration curve 400 for sensor 132. In a typical case, an accuracy of the disclosed air-flow sensor is limited almost entirely by an accuracy of the anemometer used to measure the air speed during calibration (typically +/−0.33-0.35 m/s), as errors in thermocouple readings and electrical power dissipation are relatively small in comparison. It should be appreciated that enhanced accuracy can be achieved with improvements in the calibration standard. Following calibration, the air-flow sensor and an upstream temperature sensor (e.g., thermocouple) are mounted into an adapter cassette. Using the same main heater power used during calibration and adjusting the guard heater to achieve the zero temperature difference condition, the measured temperature rise and calibration curve yield the average air speed within the adapter cassette.

In one embodiment, proportional-integral-derivative (PID) type automatic adjustment of guard heater power and repeatable fabrication that does not require part-by-part calibration can be readily realized to provide a 'smart server' with accurate knowledge of air-flow in an adapter area. While the discussion herein focuses on a guarded hot plate air-flow sensor designed and calibrated for adapter slots of a data processing system, it is contemplated that the sensor can be used for practically any fluid flow measurement application for which a calibration scheme can be devised.

Figure 5:
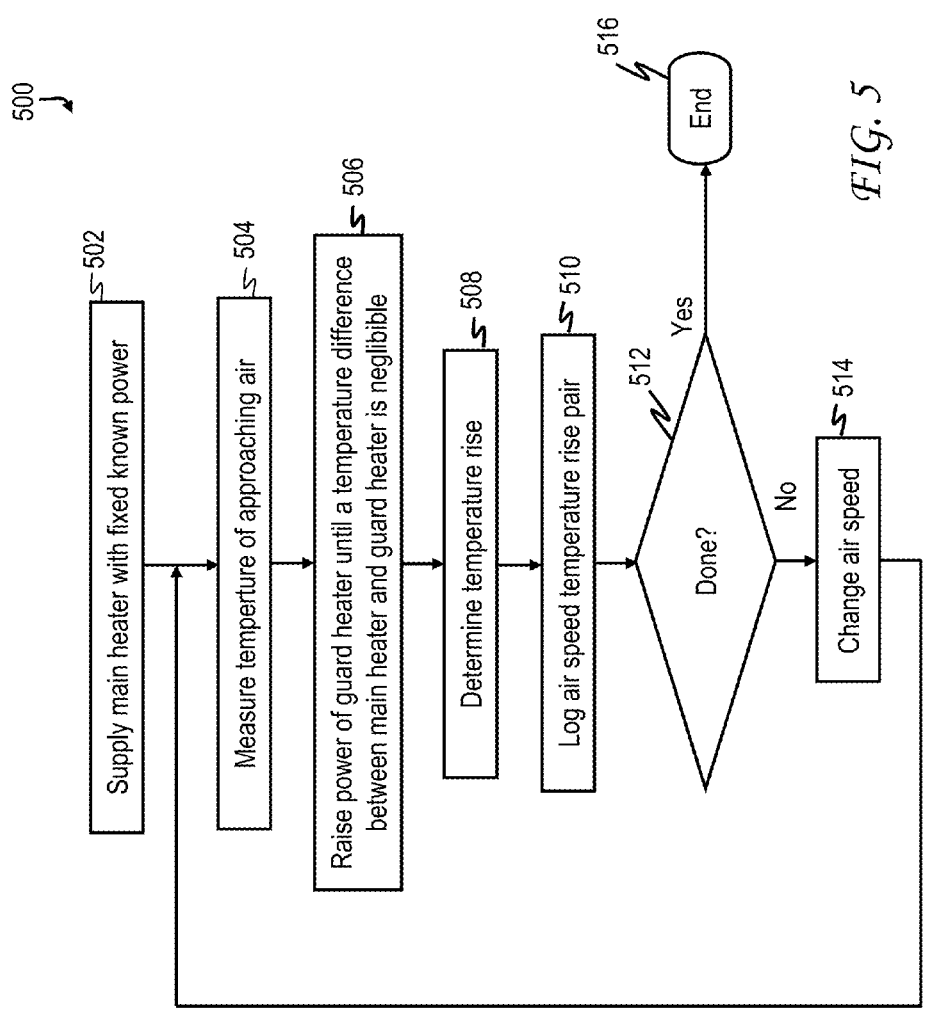
FIG. 5 is a flowchart of an exemplary process for obtaining a calibration curve for an air-flow sensor configured according to one embodiment of the present disclosure.

With reference to FIG. 5, a flow chart of an exemplary process 500 for calibrating air-flow sensor 132, according to one embodiment of the present disclosure, is illustrated. For example, process 500 may be executed by processor 102 of data processing system 110. At block 502, process 500 is initiated (e.g., when a user of data processing system 110 initiates a calibration routine) at which point processor 102 causes a fixed known power to be supplied to main heater 213. Next, in block 504 processor 102 measures a temperature of approaching air (i.e., air supplied by fan 136) using air temperature sensor (e.g., thermocouple) 134. Then, in block 506, processor 102 causes power supplied to guard heater 203 to be raised until a temperature difference between main heater 213 and guard heater 203 is negligible (e.g., less than a predetermined value, such as 0.25 degrees Celsius). Next, in block 508, processor 102 determines a temperature rise (i.e., the temperature rise of cap 214 relative to the approaching air). Then, in block 510, processor 102 logs the air speed-temperature pair. Then, in block 512 processor 102 determines whether the calibration routine is done (i.e. whether enough calibration points have been determined to provide a desired accuracy). In response to a determination at block 512 that the calibration routine has completed, control transfers from block 512 to block 516 where process 500 terminates. In response to a determination at block 512 that additional calibration points are to be determined, control transfers from block 512 to block 514 where processor 102 changes the air speed by controlling fan 136, and control transfers to block 504. It should be appreciated that air speed may be determined by an anemometer (not shown) or other known technique.

Accordingly, an air-flow sensor has been disclosed herein that includes dual heating elements that facilitate accurate air-flow sensing independent of how the sensor is mounted or oriented. The disclosed air-flow sensor is particularly advantageous in applications where sensor orientation is problematic due to packaging constraints or air-flow direction.

In the flow charts above, the methods depicted in FIG. 5 may be embodied in a computer-readable medium containing computer-readable code such that a series of steps are performed when the computer-readable code is executed on a computing device. In some implementations, certain steps of the methods may be combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing, but does not include a computer-readable signal medium. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible storage medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage subsystems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A fluid flow sensor configured to be positioned in a fluid flow path and attached to a surface in a manner that allows fluid to flow over an extremity of the sensor, the sensor comprising:
   a base plate configured to be the coupled to the surface;
   a first heater positioned on the base plate, wherein the first heater is configured to heat the base plate;
   a first temperature sensor embedded in a first thermally conductive material and positioned to measure a first temperature of the first heater;
   a spacer positioned on the first heater, wherein the first temperature sensor is positioned between the spacer and the first heater and a thickness of the spacer is selected to provide a measurable temperature differential across the spacer;
   a second temperature sensor embedded in a second thermally conductive material;
   a second heater; and
   a cap positioned on the second heater, wherein the second heater is configured to heat the cap, and wherein the second temperature sensor is positioned between the second heater and the spacer to measure a second temperature of the second heater, where the fluid flow sensor has a cylindrical shape that allows the fluid flow sensor to be used irrespective of the orientation of incoming fluid.

2. The sensor of claim 1, wherein the first and second temperature sensors are thermocouples or calibrated electrical resistance heaters/thermometers.

3. The sensor of claim 1, wherein the base plate and cap are made of metal.

4. The sensor of claim 3, wherein the metal is aluminum.

5. The sensor of claim 1, wherein the spacer has a thermal conductivity less than about 0.4 Watts per meter Kelvin.

6. The sensor of claim 5, wherein the spacer is made of a polycarbonate resin thermoplastic.

7. The sensor of claim 1, wherein the sensor is mounted to the surface with an adhesive.

8. An air-flow sensing system for an adapter slot, comprising:
   an air-flow sensor configured to be located in an air path and mounted to a surface in a manner that allows air to flow over an extremity of the air-flow sensor, the air-flow sensor including:
      a base plate configured to be the coupled to the surface;
      a first heater positioned on the base plate, wherein the first heater is configured to heat the base plate;
      a first temperature sensor embedded in a first thermally conductive material and positioned to measure a first temperature of the first heater;
      a spacer positioned on the first heater, wherein the first temperature sensor is positioned between the spacer and the first heater and a thickness of the spacer is selected to provide a measurable temperature differential across the spacer;
      a second temperature sensor embedded in a second thermally conductive material;
      a second heater; and
      a cap positioned on the second heater, wherein the second heater is configured to heat the cap, and wherein the second temperature sensor is positioned between the second heater and the spacer to measure a second temperature of the second heater; and
   a third temperature sensor positioned upstream of the air-flow sensor and configured to be located in the air path, wherein the third temperature sensor is configured to detect a third temperature of air flowing along the air path, and wherein the air-flow sensor has a cylindrical shape that allows the air-flow sensor to be used irrespective of the orientation of incoming air.

9. The system of claim 8, wherein the first, second, and third temperature sensors are thermocouples or calibrated electrical resistance thermometers.

10. The system of claim 8, wherein the base plate and cap are made of metal.

11. The system of claim 10, wherein the metal is aluminum.

12. The system of claim 8, wherein the spacer has a thermal conductivity less than about 0.4 Watts per meter Kelvin.

13. The system of claim 12, wherein the spacer is made of polycarbonate resin thermoplastic.

14. The system of claim 8, wherein the sensor is mounted to the surface with an adhesive.

* * * * *